(12) United States Patent
McGowan et al.

(10) Patent No.: US 8,634,288 B2
(45) Date of Patent: Jan. 21, 2014

(54) SYMBOL FFT RACH PROCESSING METHODS AND DEVICES

(75) Inventors: Neil McGowan, Stittsville (CA); Marthuinus Willem Da Silveira, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 286 days.

(21) Appl. No.: 13/150,565

(22) Filed: Jun. 1, 2011

(65) Prior Publication Data
US 2012/0307743 A1  Dec. 6, 2012

(51) Int. Cl.
*H04J 11/00*  (2006.01)
(52) U.S. Cl.
USPC .......................................... 370/210; 370/329
(58) Field of Classification Search
USPC ......... 370/203–210, 320, 328–339, 342, 350, 370/441
See application file for complete search history.

(56) References Cited

U.S. PATENT DOCUMENTS

| | | | |
|---|---|---|---|
| 2005/0286409 A1* | 12/2005 | Yoon et al. ..................... | 370/210 |
| 2008/0095254 A1* | 4/2008 | Muharemovic et al. ...... | 375/260 |
| 2008/0316961 A1* | 12/2008 | Bertrand et al. .............. | 370/329 |
| 2010/0149963 A1 | 6/2010 | Bae et al. | |

FOREIGN PATENT DOCUMENTS

EP  2099188 A2  9/2009

* cited by examiner

*Primary Examiner* — Frank Duong
(74) *Attorney, Agent, or Firm* — Jean-Pierre Fortin; Ericsson Canada Inc.

(57) ABSTRACT

Methods and devices for extracting a RACH preamble using as input a number of Fast Fourier Transformed symbols, in order to extract a random access channel (RACH) preamble from a signal received in a base station from a user device, in a radio communication system, are provided. An initial cyclic prefix (symbol CP) is removed prior to performing FFT on symbols. After (1) selecting from the FFT of a symbol frequencies corresponding to the RACH band all other non-RACH frequency bins having been set to zero, (2) shifting the signal to baseband and (3) performing a FFT on the baseband signal, a phase adjustment is performed to compensate for group delays due to symbol CP gaps occurring when generating the baseband signal, the phase adjustment being determined individually for each symbol.

20 Claims, 12 Drawing Sheets

SYMBOL FFT RACH PROCESSING METHODS AND DEVICES

TECHNICAL FIELD

The present invention generally relates to methods and devices using as input a number of Fast Fourier Transformed symbols, in order to extract a random access channel (RACH) preamble from a signal received in a base station from a user device, in a radio communication system.

BACKGROUND

The 3GPP Long Term Evolution (LTE) a set of standards in the mobile network technology tree providing a set of enhancements to the Universal Mobile Telecommunications System (UMTS), while adopting 4G mobile communication technology, including an all-IP flat networking architecture. The LTE systems are capable of downlink peak rates of at least 100 Mbps, an uplink of at least 50 Mbps and supports scalable carrier bandwidths, from 1.4 MHz to 20 MHz using both frequency-division duplexing (FDD) and time-division duplexing (TDD). The main advantages with LTE are high throughput, low latency, plug and play, FDD and TDD in the same platform, an improved end-user experience and a simple architecture resulting in low operating costs.

A generic setup in a mobile radio communication system 100 (which can be an LTE system) is illustrated in FIG. 1. In the system 100, base stations such as, 105, 110, 115, serve user devices (such as, 120), specifically, the user devices located in an area (cell, marked with dashed line in FIG. 1) surrounding a respective base station. Here, the base station 110 serves the user device 120.

The communication between a base station and a user terminal is usually synchronized to occur at predetermined time slots. Since the user devices may be mobile, they may move from an area of one base station to an area of a neighboring base station. For example, the user device 120 in FIG. 1, may have previously been served by the base station 105, and has recently moved from the cell where it was served by the base station 105, to the cell where it is served by the base station 110. In this case (i.e., when entering a new cell), as well as when a user device initiates connecting to the radio communication system 100, there is a procedure involving a message exchange between the user device and the base station, for establishing and synchronizing the communication there-between.

FIGS. 2 and 3 illustrate the procedure for establishing and synchronizing the communication between a user device and a base station (e.g., the base station 110 and the user device 120 in FIG. 1). FIG. 2 illustrates the messages exchanged for establishing and synchronizing the communication. FIG. 3 illustrates the timing of these messages. First, the user device 120 acquires a signal 111 broadcasted by the base station 110 and indicating time slots and frames (i.e., the Physical Random Access Channel—PRACH) useable for sending uplink messages (i.e., from user devices to the base station) including, for example, messages with connection requests. A delay occurs between when the base station 110 sends the signal 111 and when the user device 120 receives the signal 111 due to the travel time of the signal 111 between the base station 110 and the user device 120. However, the user device 120 does not have the information that would enable correcting for this delay, and, thus, the user device 120 sends a signal 112 including a RACH preamble, at one of the time slots learned from the base station 110 and assuming no delay. Such a signal is, in fact, a request for connecting to the radio communication system via the base station.

The base station 110 receiving the signal 112 from the user device 120 is capable to estimate the time correction that the user device 120 user has to make in order to achieve a true synchronization with the base station for uplink (from the user device 120 to the base station 110) traffic. Further, the base station 110 sends a signal 113 directed to the user device 120 according to the user identifier included in the signal 112, and indicating the time correction so that later uplink messages (e.g., 114) are synchronized.

As illustrated in FIG. 4, the RACH preamble includes a cyclic prefix (RACH CP) portion lasting $T_{CP}$ and a sequential portion $T_{SEQ}$. The above described aspects of radio communication systems are described in 3GPP TS documents, current versions of which are incorporated herewith by reference. In particular, pertinent aspects are defined and described in 3GPP TS 36.211, 3GPP TR 21.905, 3GPP TS 36.201, 3GPP TS 36.212, 3GPP TS 36.213, 3GPP TS 36.214, 3GPP TS 36.104, 3GPP TS 36.101 and 3GPP TS 36.321.

Thus, using the signal 112 that includes the RACH preamble, the base station 110 is able to identify the user device 120 and to determine the round trip delay (i.e., the time correction). Upon receiving a response message 113 the user device is enabled to send synchronized messages. Once synchronization is achieved, the user device 120 is enabled to send synchronized messages to the base station 110, while sharing physical uplink channels with other users.

A conventional manner of processing received signals is illustrated in FIG. 5. The boxes in FIG. 5 correspond to steps of a method. Some of these steps may be executed on the same processor, but each box may represent different physical devices. In other words, the boxes in FIG. 5 correspond to software, hardware or a combination thereof.

The top row in FIG. 5 represents a normal processing for messages received via the physical uplink channel. In a first data processing portion 150, the cyclical portion (symbol CP) of a received signal is removed 152 and, then, the signal is subjected to a one-half subcarrier frequency shift 154. In radio communication systems other than LTE, the one-half subcarrier frequency shift may not be necessary. The signal is then divided in time pieces corresponding to a fraction (e.g., ¼ or ½) of a millisecond (ms), these pieces being named symbols. An FFT per symbol is performed on each symbol (lasting ½ or ¼ of the signal, and using 2048 points for 20 MHz bandwidth) at 156, before transmitting the resulting frequency domain signal pieces to an uplink processing module 160.

When the signal received at the base station is an unsynchronized signal including a RACH preamble (such as, signal 112 in FIG. 2), a super FFT is performed at (or in the module) 170 for about 1 ms of the signal, using as many as 24576 points for the whole signal bandwidth (e.g., 20 MHz). This super FFT involves a large amount of data to transport and buffer and requires a large amount of computation. Normal traffic processing (e.g., in the first data processing unit 150, etc.) may proceed in parallel to the data processing related to the RACH preamble. Depending on the amount of other data, the performance of both RACH preamble and normal traffic processing are impacted by the resources used for the super FFT.

The output of the super FFT is then processed in a second data processing portion 180 that is configured to receive a frequency domain signal to process and use the received signal for identifying and determining the time correction of the user device. Specifically, the second data processing portion 180 includes a module 182 selecting the 839 RACH subcarriers (as described, for example, in 3GPP TS 36.211, section 5.7.2) from the frequency domain signal output, a module 184 extracting a temporary identifier of the user device based on correlating the selected signal with Zadoff-Chu sequences, and, then, a module 186 performing an inverse FFT using 2048 points. The resulting time domain signal is then forwarded to a RACH detect module 190 for further detection. The 839 RACH subcarriers correspond to a frequency band of about 1 MHz width, but the RACH subcarriers frequency band does not have a fixed position within the whole signal bandwidth (e.g., 20 MHz). Never-the-less, most (e.g., 19 MHz) bandwidth of the whole (e.g., 20 MHz) bandwidth, is discarded in module 182.

The super FFT 170 is a substantial burden for the base station in terms of storage space and power, while most of its result is discarded immediately thereafter. Accordingly, it would be desirable to provide devices, systems and methods that process the uplink unsynchronized signals including the RACH preamble more efficiently than by performing the super FFT.

SUMMARY

Methods of extracting RACH preamble from an uplink signal using symbol FFT according to various embodiments lower the amount of data that needs to be buffered and transferred compared to the use of a super FFT. These methods operate substantially better (yielding fewer errors) than the conventional use of a super FFT under loaded conditions (i.e., when uplink traffic is present).

According to one exemplary embodiment, a method for extracting a random access channel (RACH) preamble from a signal received in a base station from a user device in a LTE system is provided. Prior to executing the method the base station removes an initial cyclic prefix (symbol CP) portion from the signal, and performs a ½ subcarrier frequency shift. The method includes, for a predetermined number of successive symbols of the signal) after the symbol CP portion has been removed, (1) performing a FFT of a symbol, (2) generating, from the FFT of the symbol, a baseband signal corresponding to a RACH frequency band all other non-RACH frequency bins having been set to zero, (3) performing an inverse FFT on the baseband signal to yield a time domain signal, (4) adjusting a phase of the time domain signal to compensate for group delays due to symbol CP gaps occurring during the generating, wherein a phase adjustment is determined individually for each symbol, (5) padding zeros in the phase-adjusted time domain signal to account for the initial symbol CP portion that was removed, (6) down-sampling the phase-adjusted time domain signal, and (7) storing the down-sampled signal to form a time sequence by concatenation. The method further includes selecting the RACH preamble from the stored sequence, and performing a FFT on the RACH preamble using at least 1024 points, wherein the FFT of the RACH preamble is further used for identifying and synchronizing the user device with the base station.

According to another exemplary embodiment, a method of extracting a random access channel (RACH) preamble from a signal received in a base station from a user device, in a radio communication system, is provided. The base station has removed an initial cyclic prefix portion of the signal. The method includes, for a predetermined number of successive time portions of the signal after the symbol CP portion has been removed, (1) receiving a Fast Fourier Transformation (FFT) of a portion of the signal, (2) generating, from the FFT of the portion, a baseband signal corresponding to selected subcarriers all other non-RACH frequency bins having been set to zero, (3) performing an inverse FFT on the baseband signal to yield a time domain signal, (4) adjusting a phase of the time domain signal, to compensate for group delays of symbol CP gaps occurring during the generating, wherein a phase adjustment is determined individually for each portion of the signal, (5) padding zeros in the phase-adjusted time domain signal to account for the initial symbol CP portion that was removed, and storing the phase-adjusted time domain signal with inserted zeros to form a time sequence up to the predetermined number of successive portions. The method further includes selecting the RACH preamble from the stored sequence, and performing a FFT on the selected RACH preamble, wherein the FFT of the RACH preamble is further used for identifying and synchronizing the user device with the base station.

According to another exemplary embodiment, a data processing device useable for extracting a RACH preamble from a signal received in a base station from a user device in a LTE system, is provided. From the received signal, an initial cyclic prefix (symbol CP) portion has been removed, a ½ subcarrier frequency shift has then performed, and the signal after the symbol CP portion was removed has been divided in symbols on which a Fast Fourier Transform has been performed symbol by symbol. The data processing device includes a demapping module configured (1) to receive a FFT of a symbol and (2) to generate, from the FFT of the symbol, a baseband signal corresponding to subcarriers in a current RACH frequency band all other non-RACH frequency bins having been set to zero. The data processing device further includes an IFFT module configured to perform an inverse FFT on the baseband signal to yield a time domain signal, and a phase adjust module configured to adjust a phase of the time domain signal to compensate for group delays of symbol CP gaps occurring when the baseband signal is generated. The phase adjustment is determined individually for the time domain signal corresponding to each symbol. Further, the data processing device includes a data padding module configured to insert zeros in the phase-adjusted time domain signal to account for the symbol CP portion that was removed, and a buffer configured to store the phase-adjusted time domain signal with inserted zeros in a sequence for a predetermined number of symbols. The data processing device also includes a data processing module configured to select the RACH preamble from the stored sequence, and a FFT module configured to perform a FFT on the selected RACH preamble. The FFT of the RACH preamble is then used for identifying and synchronizing the user device with the base station.

According to another exemplary embodiment, a method for retrofitting a base station in an LTE communication network is provided. The base station initially has (1) a first data processing portion configured to receive a time signal from a user device and to perform a cyclic portion removal, a one-half subcarrier frequency shift and symbol FFT, to output FFT of symbols one by one for further processing, (2) a second data processing portion configured to receive a frequency domain signal including a RACH preamble and to process and use the received frequency domain signal for identifying and synchronizing the user device, and (3) a super FFT module connected between the input of the first data processing portion and an input of the second data processing portion. The method includes disconnecting the super FFT module, and mounting a third data processing portion between an output of the first data processing portion and the input of the second data processing portion. The third data processing portion is configured to perform for a predetermined number of successive symbols of the signal after the symbol CP portion has been removed (1) generating, from the FFT of the symbol, a baseband signal corresponding to a RACH frequency band all other non-RACH frequency bins having been set to zero, (2) performing an inverse FFT on the baseband signal to yield a time domain signal, (3) adjusting a phase of the time domain signal to compensate for group delays due to symbol CP gaps occurring during the generating, wherein a phase adjustment is determined individually for each symbol, (4) padding zeros at a beginning of the phase-adjusted time domain signal to account for the symbol CP portion that was removed, and (5) storing the down-sampled signal to form a time sequence by concatenation. The third data processing portion is further configured to select the RACH preamble from the stored sequence; and to perform a FFT on the RACH preamble.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a radio communication system, such as, an LTE system. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to aspects described below in various embodiments, the super (massive) FFT is replaced by using symbol FFT. The Symbol FFT RACH Processing (SFRP) is a method to demodulate the Random Access Channel (RACH) for LTE by making use of the traffic symbol Fast Fourier Transforms (Symbol FFT) that is already being done as part of the normal uplink traffic (e.g., PUCCH or PUCCH) processing. The SFRP extracts the appropriate sub-carriers from the symbol FFTs over the RACH time period and translates these sub-carriers into a baseband time domain signal. A small FFT (1024 point) can then be performed on this translated time domain signal to get the 839 RACH sub-carriers. Correlation and detection from this point is the same as when the super FFT is used. The embodiments, which use substantially less resources (e.g., for data buffer and power) provide improvements in terms of lowering the number of errors compared with conventional processing (i.e., using the super FFT) in most situations.

Figure 5:
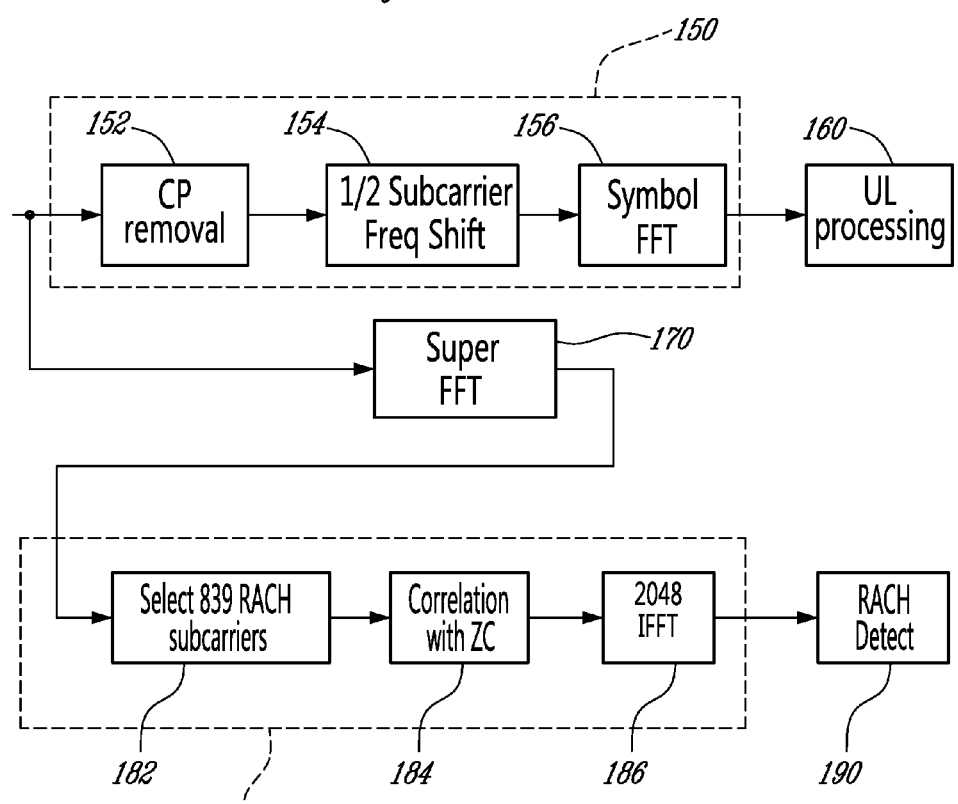
FIG. 5 is a schematic diagram of a conventional device for extracting random access channel (RACH) preamble from an uplink signal.
Figure 6:
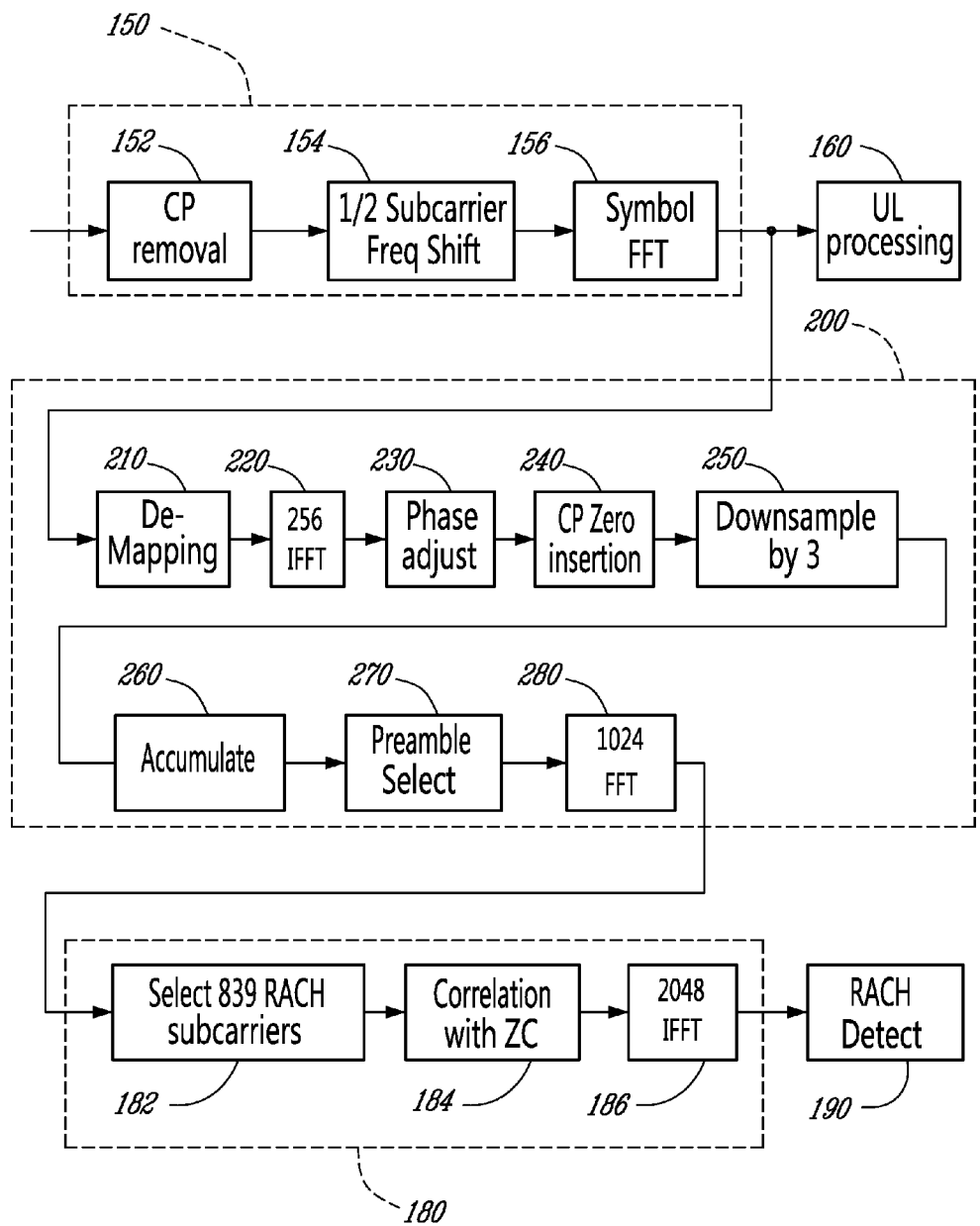
FIG. 6 is a schematic diagram of a device for extracting random access channel (RACH) preamble from an uplink signal according to an exemplary embodiment.

FIG. 6 is a schematic diagram of an apparatus including a device (200) for extracting random access channel (RACH) preamble from an uplink signal according to an exemplary embodiment. The apparatus illustrated in FIG. 6 includes the same first data processing portion 150, uplink processing module 160, second data processing portion 180 and RACH detect module 190 as the conventional apparatus illustrated in FIG. 5. However, the super FFT 170 module of the conventional apparatus illustrated in FIG. 5 is no longer present, and instead the device 200 includes modules that implement and, thus, are configured to perform the SFRP.

Figure 1:
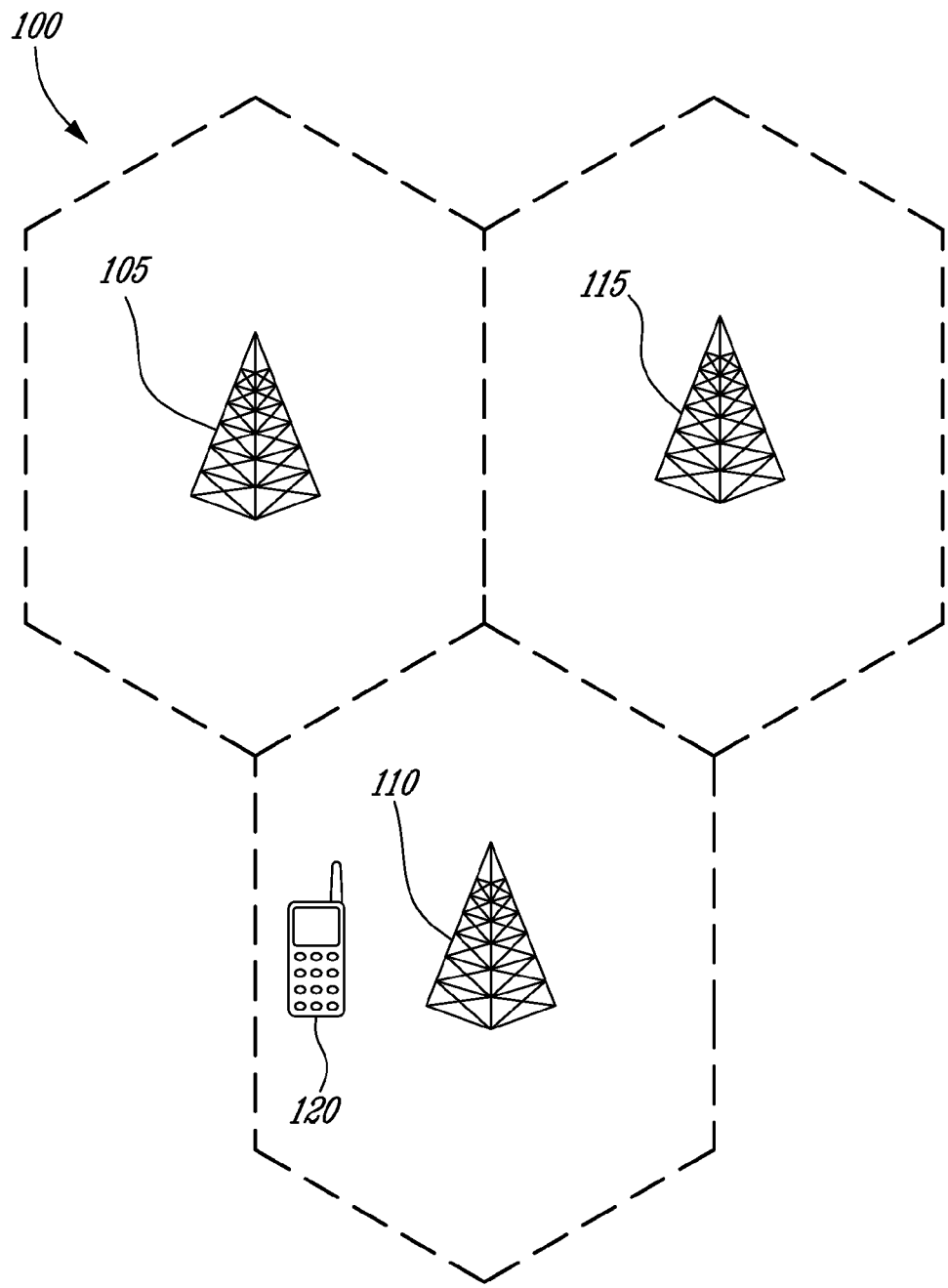
FIG. 1 is a schematic diagram of a radio communication system.
Figure 2:
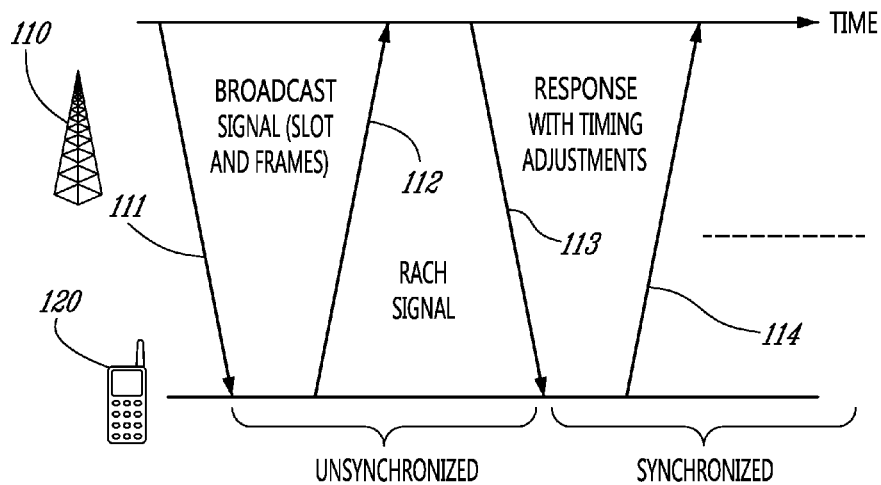
FIG. 2 is a diagram illustrating a procedure for establishing communication between a user equipment and a base station.
Figure 3:
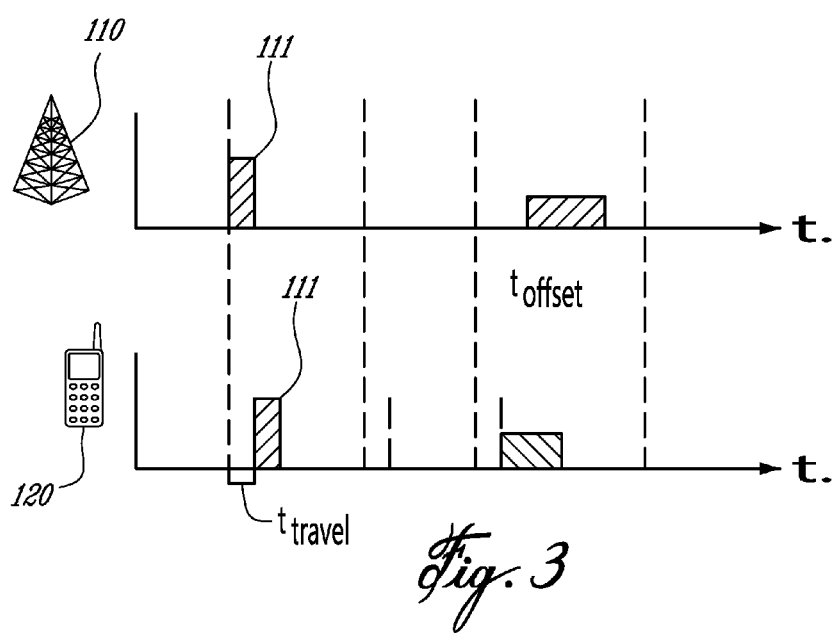
FIG. 3 is a representation of timing in a procedure for establishing communication between a user equipment and a base station.
Figure 4:
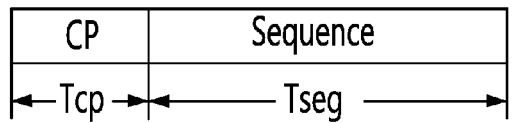
FIG. 4 illustrates a random access preamble format.

In an uplink unsynchronized message (such as, 112 in FIG. 2), a portion including the RACH preamble lasts about 1 ms, and, thus, about 12 symbols would cover the time range covering the RACH preamble. The symbol FFT is a coarser FFT than the super FFT, and, thus, the resolution in frequency is smaller.

The output of the symbol FFT 156 for a predetermined number of symbols (e.g., 12) is input in the device 200, one by one. At (or in the module) 210, a portion of the signal where the RACH should be at that moment in time is selected. Due to the coarser FFT the selected portion, which spans about 1 MHz, covers about 72 distinct frequencies in the symbol FFT spectrum. The selected portion of the signal (all other non-RACH frequency bins having been set to zero) is shifted to baseband.

At (or in the module) 220, an inverse FFT on the selected portion, using 256 points, is performed, to transform the signal back in time domain. Then, at (or in module) 230, a phase adjustment occurs. The phase adjustment is required to compensate for the group delay of the symbol CP gaps, when moving the data to baseband (the phase of the first sample of the IFFT output may be zero or another value, which is not necessarily equal to the phase of the signal at the end of the symbol CP time). This phase adjustment for the $k^{th}$ symbol among the sequence of symbols used for extracting the RACH is $f(k+1)=f(k)+e^{j2\pi F_{RC}N_{cp}/N_{PA}}$, where $N_{CP}$ is the symbol CP length (depend on the symbol number as per 3GPP), k is the iteration number of the symbol FFT starting from 0, $f(0)=0$, $N_{PA}$ is the RACH preamble length and $F_{RC}$ is the center frequency of the RACH channel, which may be positive or negative.

Zeroes are inserted in the symbol CP times at (or in the module) 240 followed by down-sampling by a factor of 3 at (or in the module) 250. The down-sampling occurs to limit the number of points is a sequence corresponding to the RACH preamble to a number of points necessary and relevant (the number of 256 points used in the IFFT at 230 being in excess of 3×72, which is the number of frequencies corresponding to the RACH band after 210, and this number being further increased by the symbol CP zero insertion).

The data processing at 210, 220, 230, 240 and 250 is performed for each of the symbols considered (e.g., the number of symbols may be 12). The output of block 250 is buffered such that the outputs for all the symbols are arranged in a sequence corresponding to time. The RACH preamble portion is then selected from this sequence at 270 and a FFT on the selected portion is performed using 1024 points at (or in the module) 280. The output of this FFT is then input in the second data processing portion 180 that is configured to receive a frequency domain signal 180 to process and use the received signal for identifying and determining the time correction of the user device. That is, the 839 super sub-carriers are selected from the result of 1024-point FFT at 182, RACH detection is then performed by correlating the selected frequencies against the desired ZC sequences at 184, and a 2048-point IFFT at 186 is followed by the normal RACH detection process at 190.

The SFRP method described here is described for RACH preamble format 0 however it can also be similarly applied to the other preamble formats (e.g., as described in TS 36.211 section 5.7) having different lengths of the RACH CP and/or lengths of the sequence. The RACH CP may be longer to allow for larger cell sizes and the RACH preamble sequence may be repeated thereby becoming longer. In addition, the symbol CP may have a normal symbol CP length or an extended symbol CP length.

Figure 7:
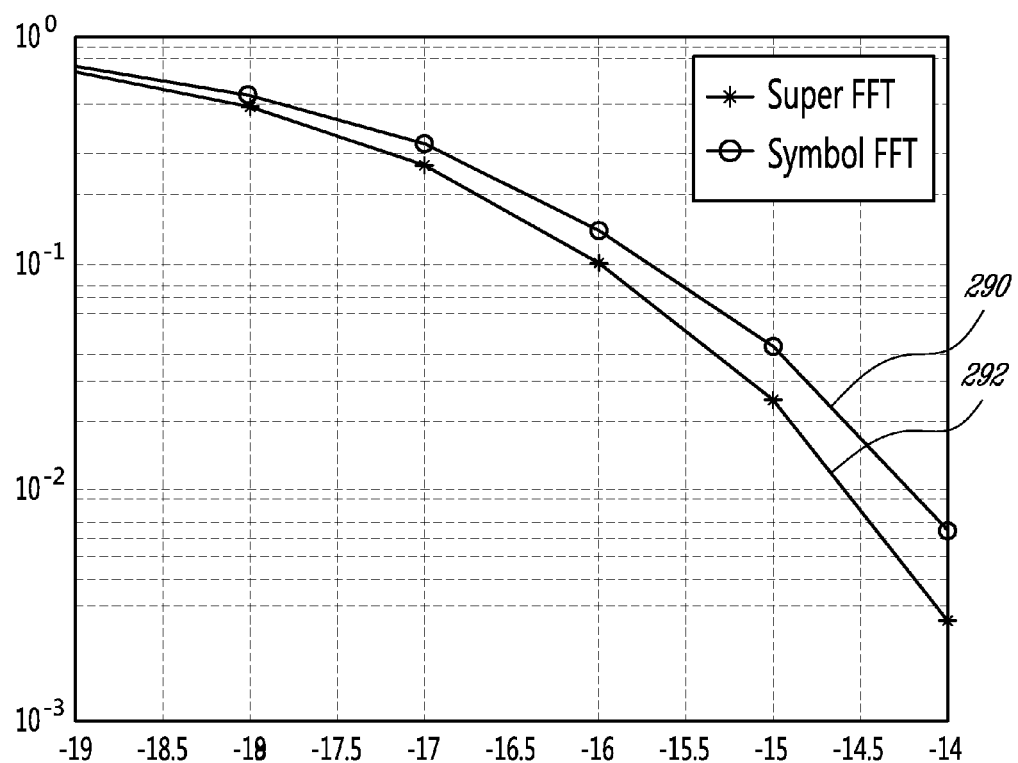
FIG. 7 is a graph comparing performance of a conventional device and performance of a device according to an exemplary embodiment in absence of other uplink traffic.

FIG. 7 is a graph representing a missed detection probability (on the y-axis) versus signals to noise ratio (on the x-axis) the noise being additive white Gaussian noise (AWGN), when the uplink signal carries only the RACH preamble and no other traffic (e.g., PUSCH or PUCCH traffic) and with a single receive antenna. In this case, the super FFT, line 292, performs slightly better (yielding slightly fewer errors) than the SFRP method, line 290, due to the fact that in the SFRP method, the data during the normal symbol CP times are replaced with zeros.

Figure 8:
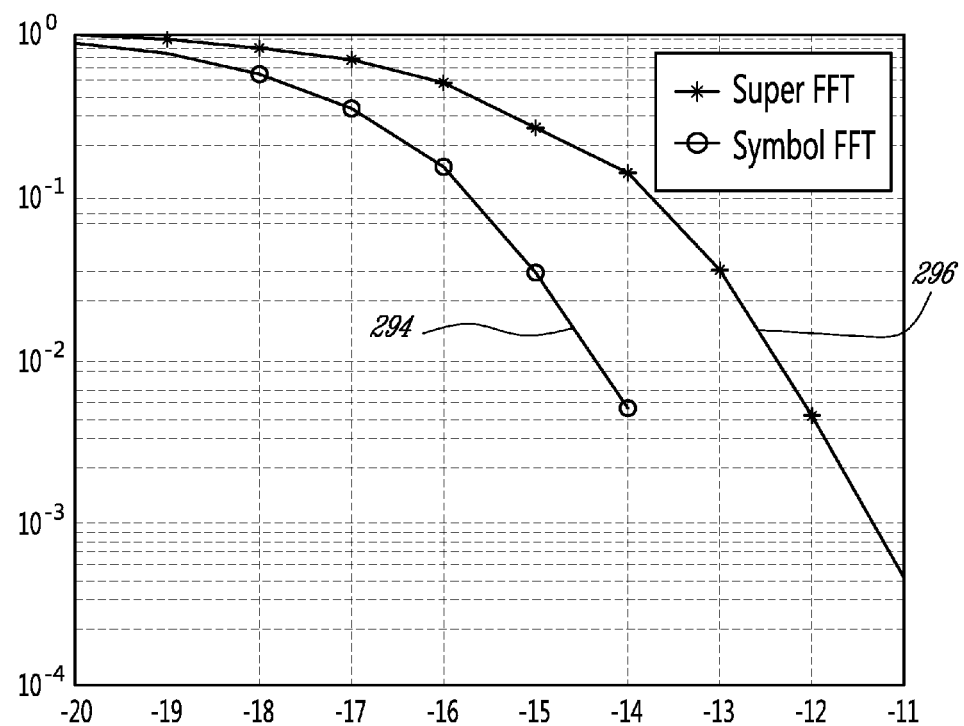
FIG. 8 is a graph comparing performance of a conventional device and performance of a device according to an exemplary embodiment when other uplink traffic is present.

FIG. 8 is a graph representing a missed detection probability (on the y-axis) versus signals to noise ratio (on the x-axis), the noise being AWGN, when the uplink signal (including PUSCH) carries besides the RACH preamble and PUSCH traffic with 20 dB signal to noise ratio. Note that although PUSCH is mentioned, the method may be applied to PUCCH or other uplink communication. In this case, the super FFT, line 296, performs substantially worse (yielding more errors) than the SFRP method, line 294.

Figure 9:
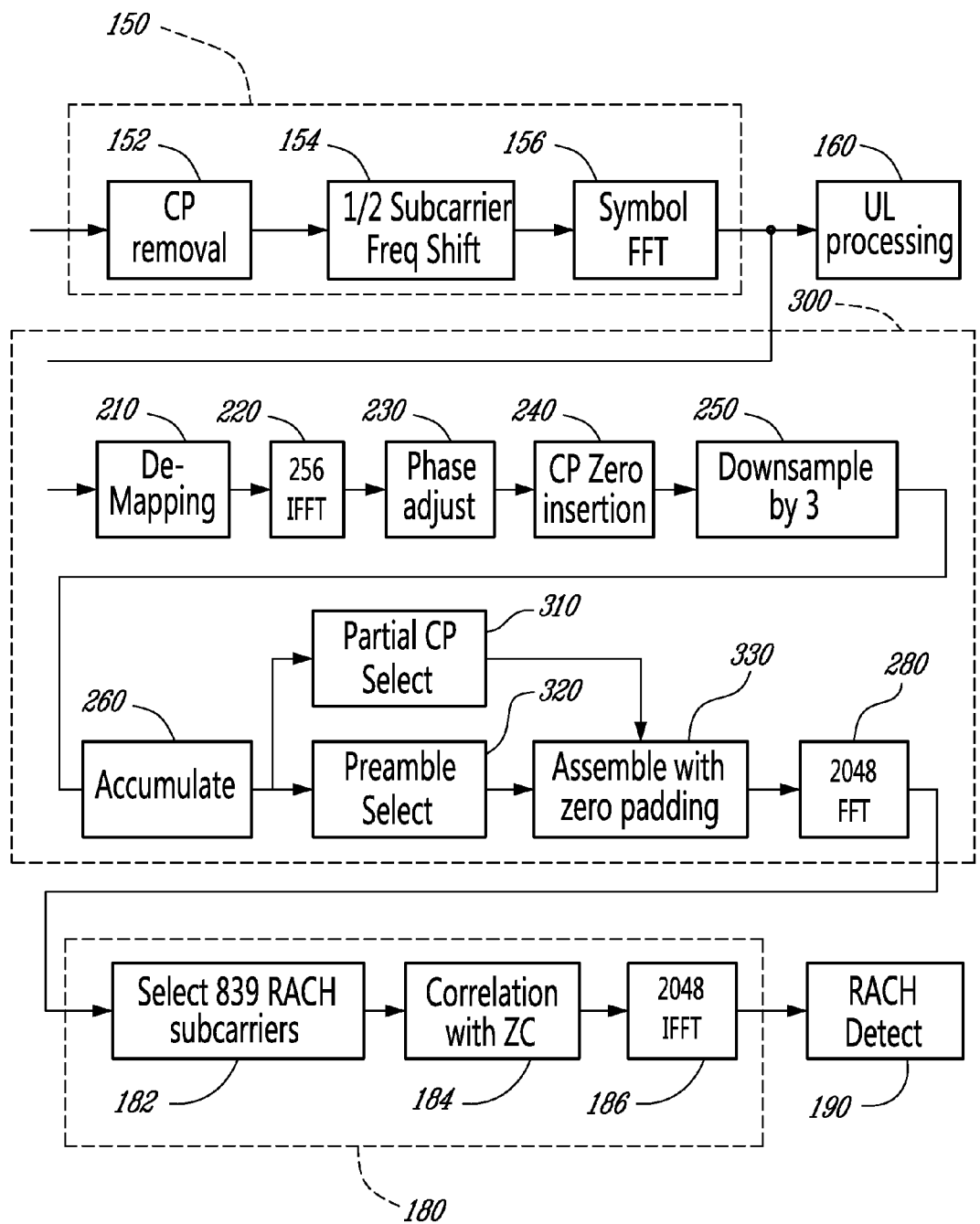
FIG. 9 is a schematic diagram of a device for extracting random access channel (RACH) preamble from an uplink signal according to another exemplary embodiment.
Figure 10:
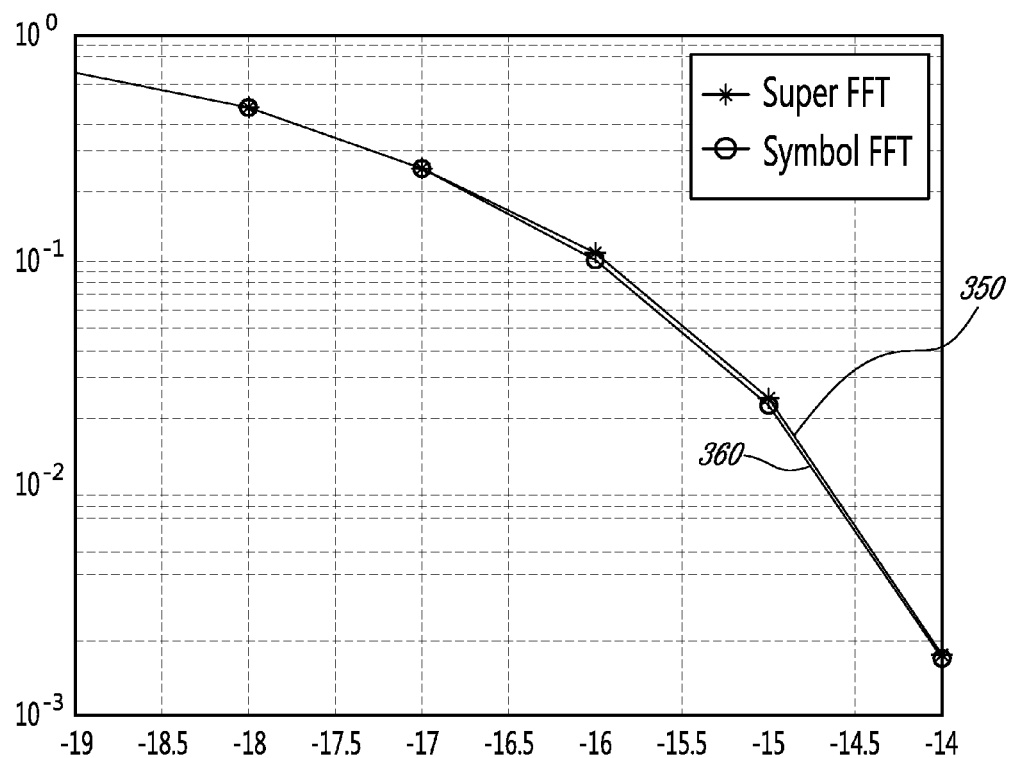
FIG. 10 is a graph comparing performance of a conventional device and performance of a device according to another exemplary embodiment in absence of other uplink traffic.

FIG. 9 is a schematic diagram of an apparatus including a device (300) for extracting random access channel (RACH) preamble from an uplink signal according to another exemplary embodiment. The apparatus illustrated in FIG. 9 includes the same first data processing portion 150, uplink processing module 160, second data processing portion 180 and RACH detect module 190 as the conventional apparatus illustrated in FIG. 5 and as the apparatus in FIG. 6. Also, the apparatus illustrated in FIG. 9 includes the same second data processing portion 180 and RACH detect module as the conventional apparatus illustrated in FIG. 5 and as the apparatus in FIG. 6.

Similar to the apparatus illustrated in FIG. 6, the apparatus in FIG. 9 does no longer include the super FFT 170 module of the conventional apparatus illustrated in FIG. 5. Instead the device 300 of the apparatus in FIG. 9 includes modules that implement and, thus, are configured to perform an extended SFRP.

The output of the symbol FFT 156 for a predetermined number of symbols (e.g., 12) is input in the device 300, one by one. The symbols are processed individually as described relative to the device 200, in modules 210, 220, 230, 240, and 250 and accumulated at 260. From the accumulated time sequence are selected not only the RACH preamble at (or in the module) 320, but also a partial RACH CP at (or in the module) 310. The RACH preamble and the partial RACH CP are assembled and zero padded as necessary at (or in the module) 330. A 2048-point FFT is then applied at (or in the module) 340. Similar to the device/method 200, the device/method 300 has been described for PRACH preamble format 0 but can be applied to the other preamble formats.

FIG. 9 is a graph representing a missed detection probability (on the y-axis) versus signals to noise ratio (on the x-axis) the noise being additive white Gaussian noise (AWGN), when the uplink signal carries only the RACH preamble and no other traffic (i.e., PUSCH traffic) and with a single receive antenna. In this case, the super FFT, line 350, performs the same as the extended SFRP method, line 360, due to the fact that the extended SFRP method uses part of the RACH CP time. When other PUSCH traffic is present, the extended SFRP method operates better than the SFRP method, thus, better than using the super FFT.

Figure 11:
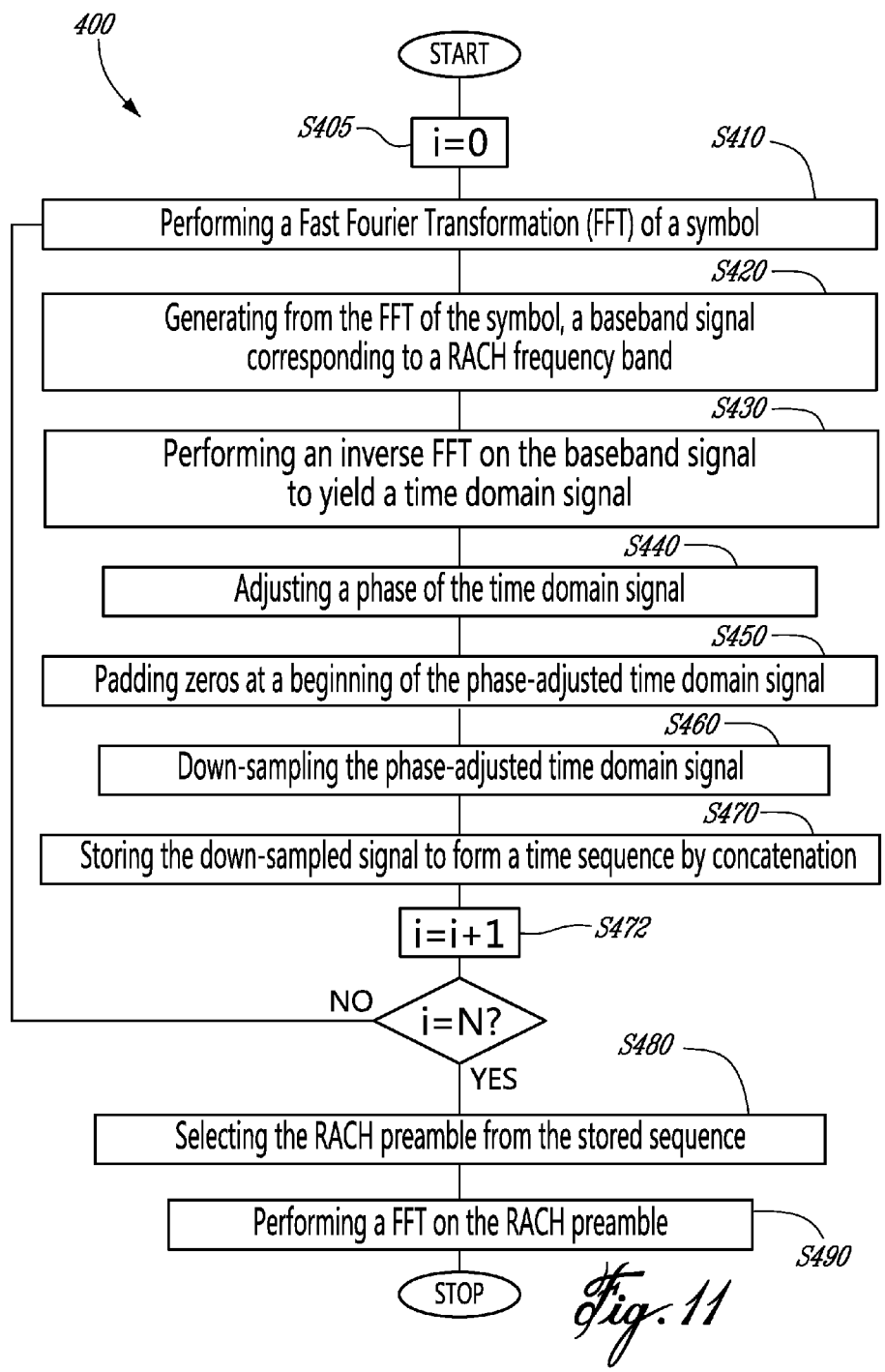
FIG. 11 is a flow diagram of a method for extracting a random access channel (RACH) preamble from a signal received in a base station from a user device according to an exemplary embodiment.
Figure 12:
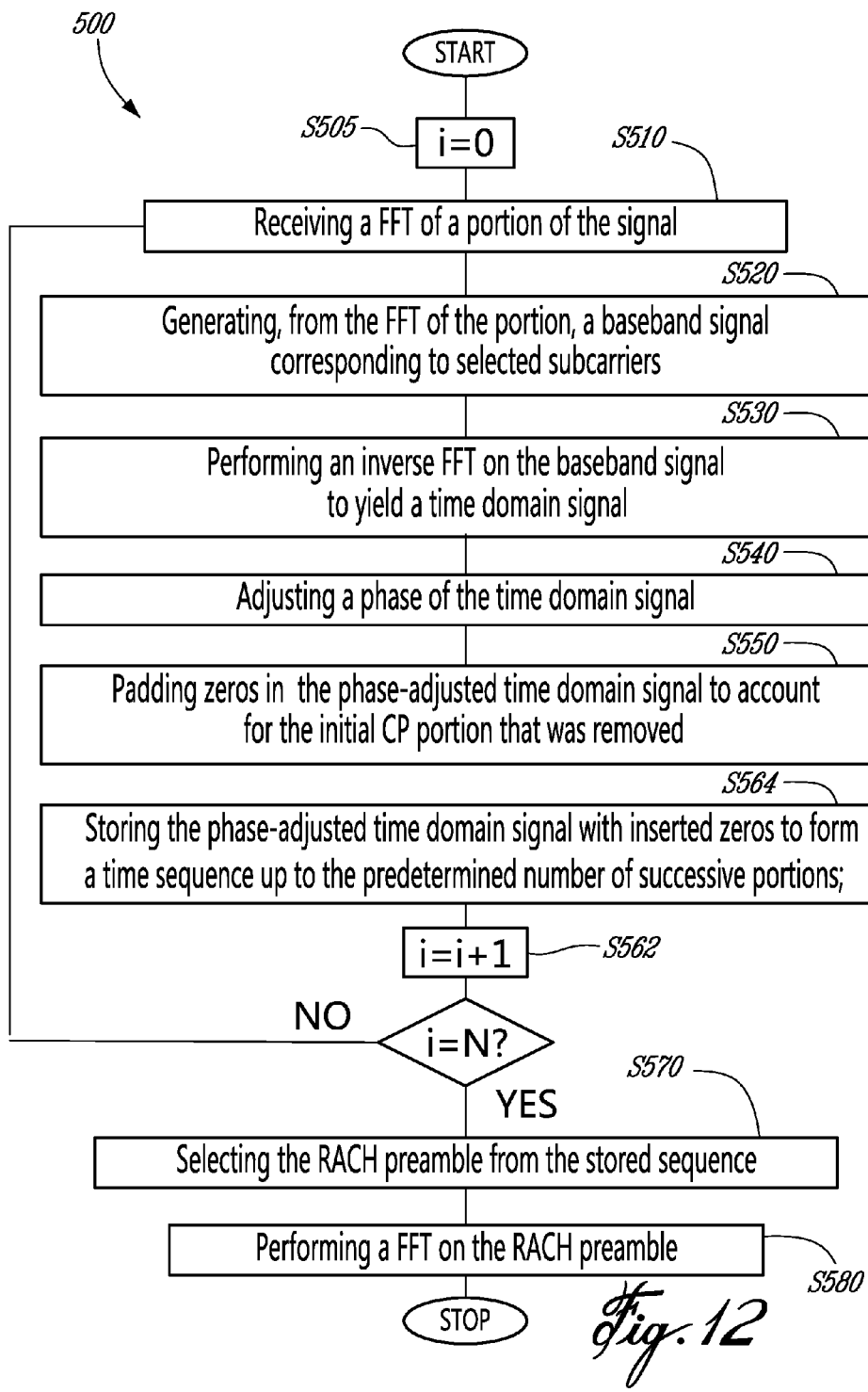
FIG. 12 is a flow diagram of a method for extracting a random access channel (RACH) preamble from a signal received in a base station from a user device according to another exemplary embodiment.

A flow diagram of a SFRP method 400 for extracting a random access channel (RACH) preamble from an uplink signal in an LTE system is illustrated in FIG. 11. The method 400 may be executed by device 200 together with the block 156 in FIG. 6. A counter "i" is initialized at S405, to track the number of symbols used to extract the RACH preamble. After an initial cyclic prefix portion has been removed from the signal and a ½ subcarrier shift has been performed, an FFT is performed on symbols (which are portions of the signal after the symbol CP portion has been removed corresponding to a predetermined time interval) one by one at S410. Then, a baseband signal is generated to correspond to the RACH frequency band all other non-RACH frequency bins having been set to zero, at S420. For example, if the RACH frequency band has a width of 1 MHz, the FFT signal corresponding to 72 frequencies may be selected.

The method 400 further includes performing an inverse FFT on the baseband signal to yield a time domain signal, at S430, and adjusting a phase of the time domain signal to compensate for group delays due to symbol CP gaps occurring during the generating, at S440. The phase adjustment is determined individually for each symbol depending on the location of the RACH frequency band at that moment. Zeros are added at the beginning of the phase-adjusted time domain signal to account for the symbol CP portion that was removed, at S450. Further, the method includes down-sampling the phase-adjusted time domain signal at S460.

The results of S410-S460 corresponding to a predetermined number of symbols are stored as a time sequence, one after the other, at S470. The counter I is incremented, at S472, and a decision block tests whether the incremented counter has reached the predetermined number, at S474. If the incremented counter has not reached the predetermined number (the "NO" branch), another symbol is processed through steps S410-S460.

If the incremented counter has reached the predetermined number (the "YES" branch), the RACH preamble is selected from the stored sequence at S480 (since the processed symbols cover the preamble RACH time, but likely exceed the duration of the preamble RACH). Then, a FFT using at least 1024 points is performed at S490, to provide the RACH preamble in a form that would enable the base station to further determine a temporary identifier of the user device (e.g., by correlating it with ZC sequence), and a timing correction necessary for synchronization (which correction becomes necessary due to the distance between the base station and the user device).

In a more general perspective, method 500 (whose flow diagram is illustrated in FIG. 6) may be performed, for example, by device 200 in FIG. 6 or device 300 in FIG. 9, receiving FFT of portions of signal one by one from the block 156. Prior to performing this FFT, an initial cyclic prefix (symbol CP) portion has been removed from the signal received in the base station (e.g., 110) from the user device (e.g., 120). Additionally, in LTE systems, a one-half subcarrier frequency shift is performed.

The steps S510 to S564 are performed a predetermined number of successive time portions of the signal covering a time interval during which the preamble RACH is transmitted. A counter "i" is initialized at S505, to track the number of symbols used to extract the RACH preamble. Method 500 includes receiving a Fast Fourier Transformation (FFT) of a portion of the signal, at S510, and generating, from the FFT of the portion (all other non-RACH frequency bins having been set to zero), a baseband signal corresponding to selected subcarriers, at S520. The selected subcarriers are in a current RACH frequency band. The counter i is incremented, at S562, and a decision block tests whether the incremented counter has reached the predetermined number, at S564. If the incremented counter has not reached the predetermined number (the "NO" branch), another portion is processed through steps S510-S564.

If the incremented counter has reached the predetermined number (the "YES" branch), the RACH preamble is selected from the stored sequence at S570 (since the processed portions cover the preamble RACH time, but likely exceed the duration of the preamble RACH). Then, a FFT using at least 1024 points is performed at S580, to provide the RACH preamble in a form that would enable the base station to further determine a temporary identifier of the user device (e.g., by correlating it with ZC sequence), and a timing correction necessary for synchronization (which correction becomes necessary due to the distance between the base station and the user device).

The embodiments described above (SFRP and extended SFRP) provide methods operating substantially better (yielding) than the conventional use of a super FFT to extract the RACH preamble under loaded conditions (i.e., when PUSCH traffic is present).

The amount of data that needs to be buffered and transferred is greatly reduced in SFRP-type of methods. Preferable, the symbol FFT may be performed and then used for both RACH and PUSCH processing which simplifies the uplink data processing interface and reduces the amount of data transfer necessary. Thus, computational complexity is reduced by reusing the symbol FFT.

Figure 13:
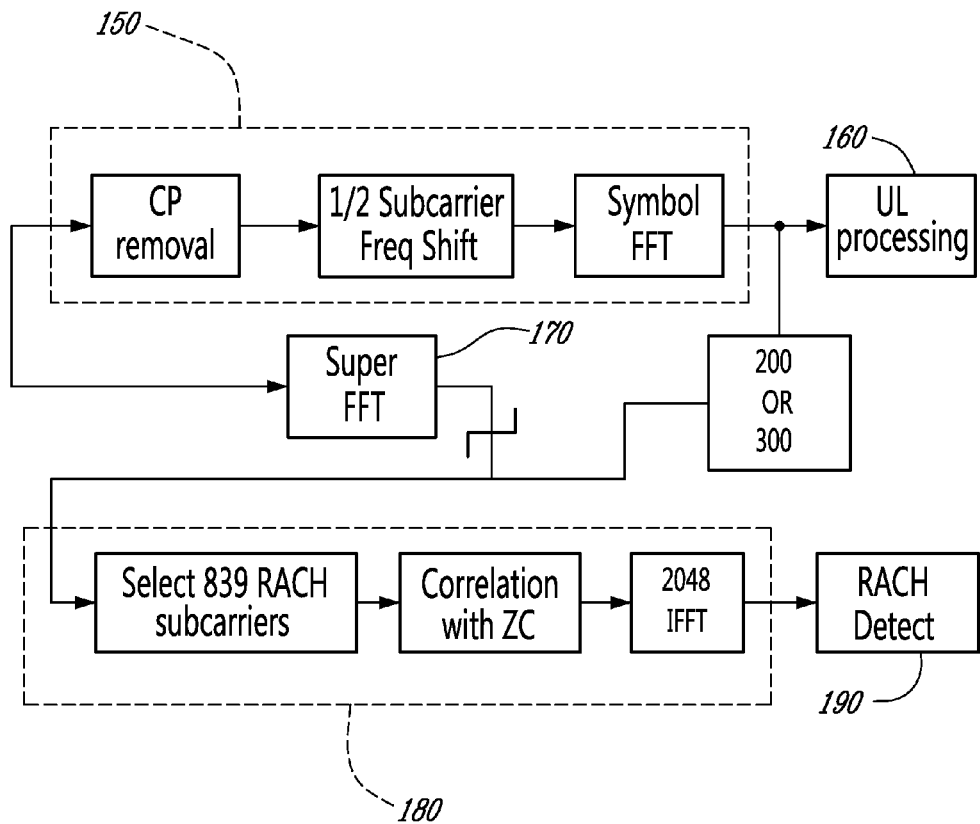
FIG. 13 is a module diagram illustrating a transformation for retrofitting of a conventional device to a device according to an exemplary embodiment.
Figure 14:
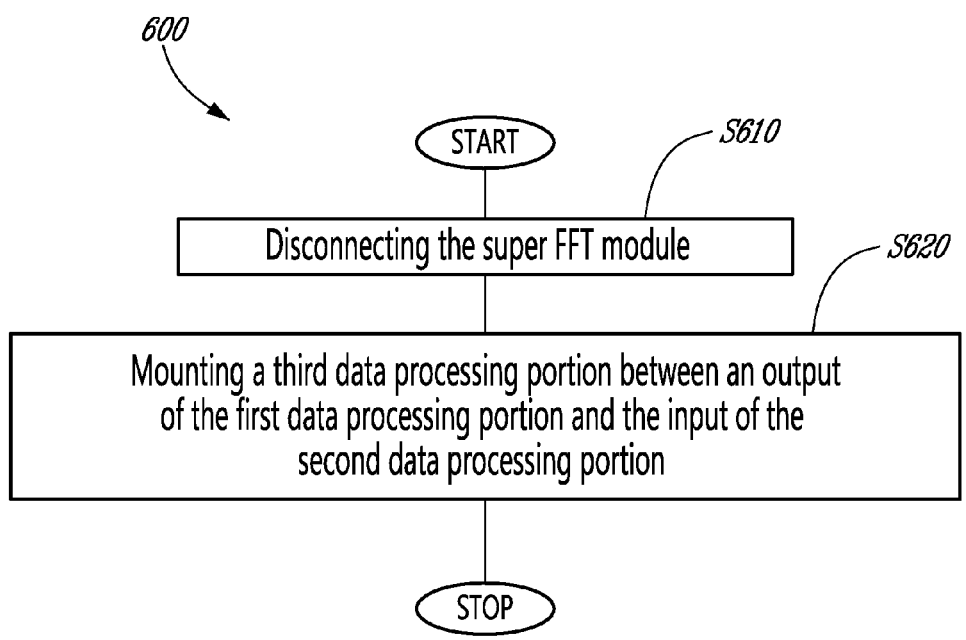
FIG. 14 is a flow diagram of a method for retrofitting a base station in a communication network according to an exemplary embodiment.

In view of these advantages, a conventional base station such as the one illustrated in FIG. 13, using a super FFT module 170 may be retrofitted to use a device performing SFRP. FIG. 14 is a flow diagram illustration such a retrofitting according to another exemplary embodiment. The conventional base station includes a first data processing portion 150 configured to receive a time signal from a user device and to perform cyclic portion removal, a one-half subcarrier frequency shift and symbol FFT, to output FFT of symbols one by one for further processing, a second data processing portion 180 configured to receive a frequency domain signal including the RACH preamble and to process and use the received frequency domain signal for identifying and synchronizing the user device. The super FFT module 170 is initially connected between the input of the first data processing portion 150 and an input of the second data processing portion 180.

Method 600 includes disconnecting the super FFT module 170, at S610. This operation is illustrated by a cut 605 interrupting the connection between the super FFT 170 and the input of the second data processing portion 180, in FIG. 13. However, the super FFT is disconnected also if a cut interrupts the connection between the super FFT 170 and the input of the first data processing portion 150, or merely if power is no longer supplied to the super FFT module 170. Ideally, the super FFT block 170 should be removed, but this may not be feasible or economic.

Further, as illustrated in FIG. 13, a third data processing portion (i.e., a device configured to perform SFRP such as 200 in FIG. 6 or 300 in FIG. 9) is mounted between an output of the first data processing portion 150 and the input of the second data processing portion 180, at S620. The third data processing portion is configured to is configured to perform for a predetermined number of successive symbols of the signal (1) generating, from the FFT of the symbol, a baseband signal corresponding to a RACH frequency band, (2) performing an inverse FFT on the baseband signal to yield a time domain signal, (3) adjusting a phase of the time domain signal to compensate for group delays due to symbol CP gaps occurring during the generating, wherein a phase adjustment is determined individually for each symbol, (4) padding zeros at a beginning of the phase-adjusted time domain signal to account for the symbol CP portion that was removed, and (5) storing the down-sampled signal to form a time sequence by concatenation. The third data processing portion is further configured to select the RACH preamble from the stored sequence; and to perform a FFT on the RACH preamble.

The third data processing portion may also be configured to select a RACH CP from the stored sequence, and to assemble the RACH preamble and the RACH CP in a time sequence, while padding the resulting time sequence with zeros as necessary before performing the FFT of the resulting time sequence as the RACH preamble.

The disclosed exemplary embodiments provide methods and devices configured to perform RACH processing (i.e., extracting the RACH preamble) using symbol FFT. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed inventions. However, one skilled in the art would understand that various embodiments may be practiced without such specific details.

What is claimed is:

1. A method (400) for extracting a random access channel (RACH) preamble from a signal received in a base station (110) from a user device (120), in a (Long Term Evolution) LTE system (100), wherein prior to executing the method the base station removes an initial cyclic prefix (symbol CP) portion from the signal, and performs a ½ subcarrier frequency shift, the method comprising:
 for a predetermined number of successive symbols of the signal (S405, S472, S474) after the symbol CP portion has been removed
  performing (S410) a Fast Fourier Transformation (FFT) of a symbol,
  generating (S420), from the FFT of the symbol, a baseband signal corresponding to a RACH frequency band all other non-RACH frequency bins having been set to zero,
  performing (S430) an inverse FFT on the baseband signal to yield a time domain signal,
  adjusting (S440) a phase of the time domain signal to compensate for group delays due to symbol CP gaps occurring during the generating, wherein a phase adjustment is determined individually for each symbol,
  padding zeros (S450) at a beginning of the phase-adjusted time domain signal to account for the symbol CP portion that was removed,
  down-sampling (S460) the phase-adjusted time domain signal, and
  storing (S470) the down-sampled signal to form a time sequence by concatenation;
 selecting (S480) the RACH preamble from the stored sequence; and
 performing (S490) a FFT on the RACH preamble using at least 1024 points, wherein the FFT of the RACH preamble is further used for identifying and synchronizing between the user device (120) with the base station (110).

2. The method of claim 1, further comprising:
 selecting a RACH CP from the stored sequence; and
 assembling the RACH preamble and the RACH CP in a time sequence, and padding the resulting time sequence with zeros as necessary before performing the FFT of the resulting time sequence as the RACH preamble using 2048 points, to output the FFT of the RACH preamble that is further used for identifying and synchronizing the user device with the base station.

3. A method (500) of extracting a random access channel (RACH) preamble from a signal received in a base station (110) from a user device (120), in a radio communication system (100), wherein the base station has removed an initial cyclic prefix (symbol CP) portion of the signal, and has performed a FFT on time portions of the signal, the method comprising:
 for a predetermined number of successive time portions of the signal (S505, S562, S564) after the symbol CP portion has been removed,
  receiving (S510) a Fast Fourier Transformation (FFT) of a portion of the signal,
  generating (S520), from the FFT of the portion, a baseband signal corresponding to selected subcarriers all other non-RACH frequency bins having been set to zero,
  performing (S530) an inverse FFT on the baseband signal to yield a time domain signal,
  adjusting (S540) a phase of the time domain signal, to compensate for group delays of symbol CP gaps occurring during the generating, wherein a phase adjustment is determined individually for each portion of the signal,
  padding zeros (S550) in the phase-adjusted time domain signal to account for the initial symbol CP portion that was removed, and
  storing (S560) the phase-adjusted time domain signal with inserted zeros to form a time sequence up to the predetermined number of successive portions;
 selecting (S570) the RACH preamble from the stored sequence; and
 performing (S580) a FFT on the selected RACH preamble, wherein the FFT of the RACH preamble is further used for identifying and synchronizing the user device (120) with the base station (110).

4. The method of claim 3, wherein the inverse FFT is performed on a number of points which is a smallest number that is a power of 2 and is at least three times larger than a number of the selected subcarriers.

5. The method of claim 4, further comprising:
 down-sampling the time domain signal with inserted zeros to keep one sample out of any sequence of three before storing.

6. The method of claim 4, wherein the number of selected subcarriers is 72 and the number of points on used to perform the inverse FFT on the baseband signal is 256.

7. The method of claim 6, wherein the FFT on the RACH preamble is performed using at least 1024 points.

8. The method of claim 3, further comprising:
 processing the FFT of the RACH preamble to be used for identifying and synchronizing the user by:
  selecting a RACH frequency signal corresponding to RACH subcarriers from the FFT of the RACH preamble,
  correlating the RACH frequency signal with a Zadoff-Chu sequence to determine a temporary identifier of the user device, and
  performing an inverse FFT on the FFT of the RACH preamble.

9. The method of claim 3, wherein the radio communication system is an LTE system, each portion of the signal is a symbol and prior to performing the FFT on the symbol, the base station performs a ½ subcarrier frequency shift.

10. The method of claim 3, wherein the predetermined number of successive portions of the signal is selected to exceed an expected duration of transmitting the RACH preamble, but is otherwise minimized to avoid useless data processing.

11. The method of claim 3, wherein the phase adjustment depends on (1) a phase adjustment of the previous portion, (2) a length of the removed first part, (3) a position of the portion of the signal among the successive portions, (4) a length of the RACH preamble and (5) a center frequency of a RACH channel.

12. The method of claim 11, wherein a phase adjustment of a first portion among the successive portions is 0.

13. The method of claim 3, further comprising:
 selecting a partial RACH CP from the stored sequence; and
 assembling the RACH preamble and the partial RACH CP, and padding the resulting time sequence with zeros as necessary before performing the FFT on the resulting time sequence as the RACH preamble.

14. A data processing device (200, 300) useable for extracting a random access channel (RACH) preamble from a signal received in a base station (110) from a user device (120) in a LTE system (100), from which received signal an initial cyclic prefix (symbol CP) portion has been removed, a ½ subcarrier frequency shift has then been performed, and the signal after the symbol CP portion was removed has been divided in symbols on which a FFT has been performed symbol by symbol, the device comprising:

a demapping module (210) configured (1) to receive a FFT of a symbol and (2) to generate, from the FFT of the symbol, a baseband signal corresponding to subcarriers in a current RACH frequency band all other non-RACH frequency bins having been set to zero;

an IFFT module (220) configured to perform an inverse FFT on the baseband signal to yield a time domain signal;

a phase adjust module (230) configured to adjust a phase of the time domain signal to compensate for group delays of symbol CP gaps occurring when the baseband signal is generated, wherein a phase adjustment is determined individually for the time domain signal corresponding to each symbol;

a data padding module (240) configured to insert zeros in the phase-adjusted time domain signal to account for the symbol CP portion that was removed;

a buffer (260) configured to store the phase-adjusted time domain signal with inserted zeros in a sequence for a predetermined number of symbols;

a data processing module (270) configured to select the RACH preamble from the stored sequence; and a FFT module (280) configured to perform a FFT on the selected RACH preamble, wherein the FFT of the RACH preamble is then used for identifying and synchronizing the user device (120) with the base station (110).

15. The data processing device of claim 14, further comprising:

a down-sampler (250) configured to lower the number of points in the phase-adjusted time domain signal with inserted zeros.

16. The data processing device of claim 14, wherein the signal received in the base station has a frequency band of about 20 MHz, the predetermined number of symbols is 12, the RACH frequency band is about 1 MHz, 72 subcarriers correspond to the frequency band, the IFFT module performing the inverse FFT on the baseband signal uses 256 points, the phase-adjusted time domain signal with inserted zeros is down-sampled by 3, and the FFT module uses at least 1024 points.

17. The data processing device of claim 14, further comprising:

a secondary data processing module configured to select a partial RACH CP from the stored sequence; and a second data padding module configured to assemble the partial RACH CP with the preamble RACH and to insert zeros outputting resulting signal as to the FFT module whose output is further used for identifying and synchronizing the user device with the base station, wherein a number of points used for the FFT is larger when the output of the second data module is used than when the selected RACH preamble is used.

18. The data processing device of claim 17, wherein the signal received in the base station has a frequency band of about 20 MHz, the predetermined number of symbols is 12, the RACH frequency band is about 1 MHz, 72 subcarriers correspond to the frequency band, the IFFT module performing the inverse FFT on the baseband signal uses 256 points, the phase-adjusted time domain signal with inserted zeros is down-sampled by 3, and the FFT module uses at least 2048 points.

19. A method (600) for retrofitting a base station in an LTE communication network, the base station initially having (1) a first data processing portion (150) configured to receive a time signal from a user device and to perform cyclic portion removal, a one-half subcarrier frequency shift and symbol FFT, to output FFT of symbols one by one for further processing, (2) a second data processing portion (180) configured to receive a frequency domain signal including a RACH preamble and to process and use the received frequency domain signal for identifying and synchronizing the user device, and (3) a super FFT module (170) connected between the input of the first data processing portion (150) and an input of the second data processing portion (180), the method comprising:

disconnecting (S610) the super FFT module (170); and mounting (S620) a third data processing portion (200, 300) between an output of the first data processing portion (150) and the input of the second data processing portion (180), the third data processing portion (200, 300) is configured to perform for a predetermined number of successive symbols of the signal after the symbol CP portion has been removed generating, from the FFT of the symbol, a baseband signal corresponding to a RACH frequency band all other non-RACH frequency bins having been set to zero, performing an inverse FFT on the baseband signal to yield a time domain signal, adjusting a phase of the time domain signal to compensate for group delays due to symbol CP gaps occurring during the generating, wherein a phase adjustment is determined individually for each symbol, padding zeros at a beginning of the phase-adjusted time domain signal to account for the symbol CP portion that was removed, and storing the down-sampled signal to form a time sequence by concatenation;

to select the RACH preamble from the stored sequence; and to perform a FFT on the RACH preamble.

20. The method of claim 19, wherein the third data processing portion is further configured to select a RACH CP from the stored sequence, and to assemble the RACH preamble and the RACH CP in a time sequence, while padding the resulting time sequence with zeros as necessary before performing the FFT of the resulting time sequence as the RACH preamble.

* * * * *

UNITED STATES PATENT AND TRADEMARK OFFICE
CERTIFICATE OF CORRECTION

| | |
|---|---|
| PATENT NO. | : 8,634,288 B2 |
| APPLICATION NO. | : 13/150565 |
| DATED | : January 21, 2014 |
| INVENTOR(S) | : McGowan et al. |

It is certified that error appears in the above-identified patent and that said Letters Patent is hereby corrected as shown below:

In the Specification

In Column 6, Line 26, delete "PUCCH or" and insert -- PUSCH or --, therefor.

In Column 10, Line 37, delete "is configured to is configured to" and insert -- is configured to --, therefor.

Signed and Sealed this
Twenty-second Day of July, 2014

Michelle K. Lee
*Deputy Director of the United States Patent and Trademark Office*